Aug. 19, 1969  T. R. KELLEY  3,462,754
PERFORMANCE MONITOR FOR RECTIFIER CELLS
Filed Jan. 10, 1966
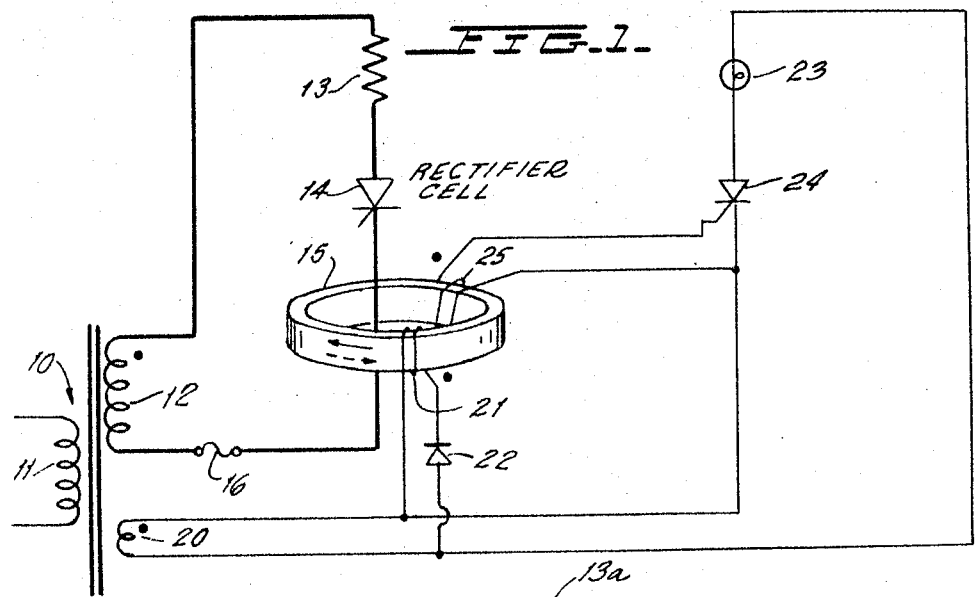
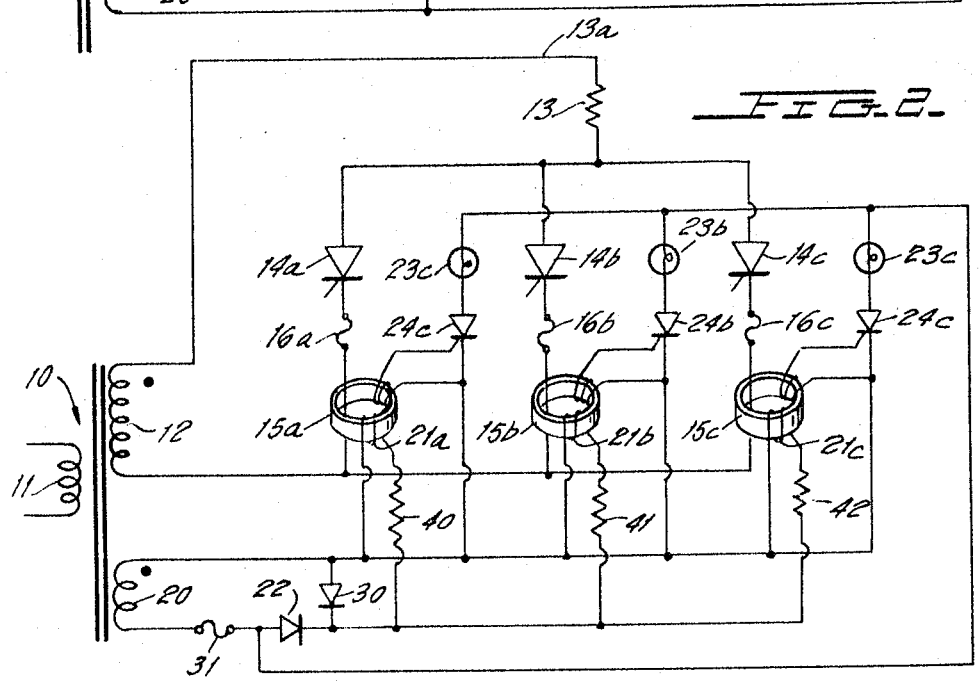
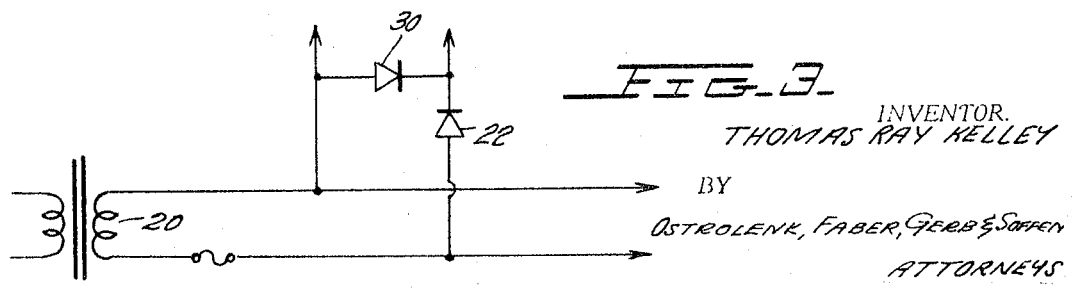
INVENTOR.
THOMAS RAY KELLEY
BY
OSTROLENK, FABER, GERB & SOFFEN
ATTORNEYS

United States Patent Office 3,462,754
Patented Aug. 19, 1969

3,462,754
PERFORMANCE MONITOR FOR RECTIFIER CELLS
Thomas Ray Kelley, Audubon, N.J., assignor, by mesne assignments, to I-T-E Imperial Corporation, Philadelphia, Pa., a corporation of Delaware
Filed Jan. 10, 1966, Ser. No. 519,695
Int. Cl. G08b 21/00; H03k 19/16
U.S. Cl. 340—253        5 Claims

ABSTRACT OF THE DISCLOSURE

A fail-safe monitoring circuit for monitoring the operation of semiconductor devices which includes a transformer connected in series with the device being monitored. The flux of the transformer is reversed each time the device conducts and this flux is reversed by a flux-reversing circuit while the device is in a blocking condition. The flux reversal of the transformer generates an output voltage which causes a switching device to conduct each half cycle in series with an indicating device so that the indicating device is energized so long as the device being monitored operates correctly and so long as all of the components in the monitoring circuit operate correctly.

---

This invention relates to a monitor circuit for monitoring the operation of rectifiers or thyristors, or the like, and more specifically relates to a novel monitoring circuit which is fail-safe and continuously energizes an indication signal so long as the cell being monitored is operative.

It is desirable particularly in the case of high power rectifier systems to provide means for monitoring the operation of the various rectifying elements, since one or more could fail without the system becoming inoperative. When, however, a sufficiently large number of elements have failed, the duty on the remaining elements becomes excessive, and the system should be shut down to replace the faulty devices.

Generally, the present invention relates to any rectifying device hereinafter referred to as a rectifier cell, and could include the normal rectifier elements, controlled rectifiers or thyristors, mercury arc rectifiers, chemical cells, and the like.

The monitoring of individual rectifier cells is well known, and is shown, for example, in U.S. Patent 2,935,676 to Keltz, assigned to the assignee of the present invention. In arrangements such as that of the Keltz patent, an indicating light or other suitable alarm is energized responsive to the failure of the cell. It is, however, possible that due to a failure within the indicating system itself the alarm would not operate with a cell failure.

The present invention provides a novel alarm system which is "fail-safe," whereby a signal is energized so long as the rectifier cell being observed operates normally, with this signal being removed responsive to an abnormal operation of a failure of the rectifier cell. However, if the failure occurs within the alarm circuit, the signal would also be removed, thus requiring an investigation by maintenance personnel who would find if the rectifier cell is, in fact, operating normally, or if an error exists in the indicating circuit.

In addition, and where the novel circuit of the invention is specifically applied to thyristors, the complete thyristor operation including the gate circuit operation would be inherently monitored, since a failure in the gate drive circuit would automatically show up when the control thyristor ceases conduction. Note that the only failure monitored in monitoring systems of the type shown in the Keltz patent are reverse current failures of the rectifier cell.

In accordance with the invention, a magnetic core is magnetically coupled in the main current-carrying circuit of the rectifier cell being monitored. The flux of this magnetic core will be changed in a first direction in the normal forward current-carrying half cycle of the rectifier cell. An auxiliary winding is then provided on the magnetic core for the purpose of reversing the flux of the core in the half cycle during which the rectifier cell does not normally conduct. A third and output winding is then provided on the core, and is connected to an auxiliary thyristor which is connected in series with a suitable indicator such as a lamp and a voltage source.

During normal operation, the flux reversing winding will be required to reverse flux during every other half cycle in a direction opposite to the flux change caused by the forward conduction of the rectifier cell being monitored. Therefore, when the flux is changed, an output voltage will be generated in the output winding, thereby to generate a firing signal for the auxiliary thyristor. Accordingly, the auxiliary thyristor will be fired every other half cycle (and extinguished on alternate half cycles) so that the indicator such as a lamp will be energized every other half cycle, thereby to be placed in an illuminated condition.

If now, for any reason, the rectifier cell being monitored fails to conduct forward current as due to a failure in the gate drive circuit of a main thyristor used for the rectifier cell, the auxiliary winding on the next half cycle will apply its volt seconds to a relatively saturated core, whereupon a small or negligible voltage is produced in the output winding which is insufficient to fire the auxiliary thyristor. Therefore, the indicating light will be extinguished, thereby to indicate a failure somewhere within either the monitoring circuit or the rectifier cell being monitored.

It should be noted that the magnetic core is preferably formed of a square loop magnetic material which is driven to full saturation by a small percentage of the volt seconds available during the full forward conducting half cycle of the normal rectifier cell being monitored. The same amount of volt seconds will then be made available from the auxiliary flux reversing circuit, whereupon if the rectifier cell ceases conduction, only a negligible amount of flux would be reversed by the auxiliary winding during its operation.

Accordingly, a primary object of this invention is to provide a novel rectifier cell monitoring system which is fail-safe.

Another object of this invention is to provide a novel monitoring system for rectifier cells which indicates any failure within the rectifier cell circuit, the monitor circuit or any power source associated therewith.

Another object of this invention is to provide a novel monitoring circuit for rectifier cells which contains no moving parts and is electrically isolated from the main power circuits being monitored.

Yet a further object of this invention is to provide a novel monitoring circuit for rectifier cells which is self-correcting, whereby intermittent failures will be indicated as failures only while the rectifier cell is not conducting properly, and requires no reset action.

Another object of this invention is to provide a novel rectifier cell monitoring system which is inexpensive and requires a relatively small amount of power.

These and other objects of this invention will become apparent from the following description when taken in connection with the drawings, in which:

FIGURE 1 is a circuit diagram of the novel invention as applied to a single rectifier cell, shown as a thyristor.

FIGURE 2 illustrates the manner in which the concept of FIGURE 1 can be applied to a plurality of parallel connected rectifier cells.

FIGURE 3 shows a modification of the auxiliary voltage source circuit to insure a failure indication even if the auxiliary circuit diode fails.

Referring first to FIGURE 1, I have illustrated therein a single phase half wave rectifier circuit which includes a rectifier transformer 10 having a primary winding 11 and secondary winding 12. Secondary winding 12 is connected in series with a suitable load 13, thyristor 14 (which could be any suitable rectifying type device) and fuse 16.

A toroidal magnetic core 15 preferably of square loop material is then placed around the main load conductor in the manner illustrated, whereupon normal forward conduction of the rectifier cell 14 will cause flux change within the core in the direction shown by the solid arrow. Preferably, the core 15 is designed such that it will go through a full flux change responsive to the minimum volt seconds that can be expected to be available from the conductor about which it is placed.

An auxiliary voltage source is then derived from auxiliary secondary winding 20 of transformer 10, and is connected to an auxiliary or flux reset winding 21 and in series with auxiliary diode 22. The auxiliary voltage source 20 is further connected in closed series relation with an energizable indicator such as lamp 23 and the anode-cathode circuit of an auxiliary thyristor 24. An output winding 25 is then wound on the core 15 and is connected to the gate cathode circuit of auxiliary thyristor 24 as shown. Note that the polarities of windings 12, 20, 21 and 25 are indicated by the conventional dot which marks the start of the windings.

In operation, the thyristor 14 will conduct every other half cycle in the usual manner and under the control of a suitable gate drive circuit. Under this normal condition, the flux of magnetic core 15 will be completely reversed, and will be driven to saturation by the least amount of volt seconds which can be expected to be supplied from the circuit under its maximum regulation conditions.

During the next half cycle, auxiliary diode 22 will permit current flow to winding 21 in a dirrection to reverse the flux in the magnetic core 15 and tends to drive the flux toward saturation in the direction of the dotted arrow. Note that the number of volt seconds supplied from auxiliary voltage source 20 will always be sufficient to saturate the core 15 in the opposite direction.

Reversal of flux of core 15 by the auxiliary voltage source during the half cycle in which rectifier cell 14 is non-conductive then causes the generation of an output voltage in winding 25 which is sufficiently high to fire thyristor 24. Therefore, thyristor 24 is fired each half cycle, thus permitting current flow through the lamp 23.

During the next half cycle, the voltage across auxiliary thyristor 24 reverses and auxiliary thyristor 24 will be extinguished. However, the excitation of lamp 23 every other half cycle will be sufficient to cause the lamp to glow with a steady light.

If, for any reason, the rectifier cell 14 does not conduct during the half cycle in which it is supposed to conduct, it will be seen that the flux of core 15 will remain in the state in which it was last placed by the auxiliary voltage source 20 and auxiliary winding 21. Therefore, in the next half cycle and when the auxiliary voltage source 20 is again impressed upon voltage source 21, magnetic core 15 will already have been saturated so that no voltage output, or only a negligible voltage output, will be developed across output winding 25. Therefore, auxiliary thyristor 24 will not fire, and the lamp 23 will remain extinguished. Therefore, until the rectifier cell 14 again conducts in its normal fashion, the lamp 23, beign extinguished, will indicate a failure of the cell.

Clearly, however, if the failure had occurred within any of the components of the monitoring circuit, a similar alarm would be raised, since the lamp 23 must normally be illuminated to indicate a satisfactory operational condition. Note that if thyristor 24 fails, twice the normal R.M.S. will appear on lamp 23, causing it to burn out in a short time, thus indicating the failure mode. Therefore, the system is fail-safe.

It will be further noted that if the rectifier cell 14 failed for only a few cycles, or failed and thereafter again became operative, the lamp 23 would again be energized, and the failure indication would be automatically removed without any need to operate a mechanical reset means.

In the circuit of FIGURE 1, it will become apparent that for all but one component failure the lamp or indicator 23 will extinguish. If, however, the auxiliary diode 22 becomes short-circuited, then during the forward conduction A-C voltage is applied to winding 21 which would generate an output voltage at winding 25 even though the rectifier cell 14 does not normally conduct.

This situation, however, may be avoided as illustrated in FIGURE 3 wherein a shunting diode 30 is connected across the input terminals to winding 21 so that a short circuit failure of either diode 22 or 30 will cause the operation of a fuse 31 in series with winding 20. This would then remove voltage from winding 21 so that lamp 23 would be extinguished to indicate failure somewhere within the system.

Note that the diode 30 of FIGURE 3 would also provide a low impedance load to dissipate the voltage induced in windings 21 and 25 by the rectifier cell forward current. This low impedance load would then reduce the negative pulse imposed on the gate circuit of auxiliary thyristor 24.

FIGURE 2 illustrates the manner in which the circuit of FIGURE 1 could be directly applied to a rectifier having a large number of parallel connected rectifier cells, and incorporates the additional diode of FIGURE 3. In FIGURE 2, all of the numerals used for equivalent circuit components in FIGURES 1 and 3 have been given similar identifying numerals except that the numerals have added thereto an *a*, *b* or *c* when applied to the first, second and third parallel connected rectifier cells. Clearly, the operation of the circuit of FIGURE 2 will be identical to that previously described in FIGURES 1 and 3. Note, however, that small resistors 40, 41 and 42 are interposed between the auxiliary voltage source 20 and the auxiliary windings 21*a*, 21*b* and 21*c*.

While FIGURE 2 shows individual cores 15*a*–15*c* and their associated monitoring equipment for each respective rectifier cell 14*a* through 14*c*, it will be clear that a single monitor circuit which includes a single core coupled to the main bus, such as conductor 13*a*, could serve to monitor a bank of parallel connected rectifier cells.

The embodiments of the invention in which an exclusive privilege or property is claimed are defined as follows:

1. A monitoring circuit for a rectifier cell connected in series with an A-C source and a load; said monitoring circuit comprising a saturable reactor having a main winding, an auxiliary winding and an output winding; an A-C auxiliary voltage source means in phase with said A-C source; diode means connected in series with said auxiliary voltage source means and said auxiliary winding; said diode and said auxiliary winding connected to reverse the flux of said saturable reactor during the half cycle of said A-C voltage source when said rectifier cell blocks current flow in its reverse direction; a switching means; and an energizable warning means; said switching means, energizable warning means and said output winding connected in series; said switching means connected to said output winding; said switching means operable between an open circuit condition and a closed circuit condition; said switching means operated to its said closed circuit condition responsive to a predetermined output voltage on said output winding during every other half cycle of said A-C voltage source and returning to its said open circuit condition on alternate half cycles whereby said energizable warning means is energized every other half cycle so long as said rectifier cell operates normally and an output voltage is generated in said output winding every other half cycle.

2. The monitoring circuit as set forth in claim 1 wherein said switching means comprises a controlled rectifier having gate, cathode and anode electrodes; said anode and cathode electrodes connected in series with said energizable warning means; said output winding connected in series with said gate and cathode electrodes.

3. The monitoring circuit as set forth in claim 2 wherein said warning means comprises a lamp.

4. The monitoring circuit as set forth in claim 1 which includes a fuse means connected in series with said auxiliary diode means and second diode means connected in closed series relation with said auxiliary voltage source, said fuse means and said auxiliary diode means and in parallel with said auxiliary winding.

5. The monitoring circuit as set forth in claim 2 which includes a fuse means connected in series with said auxiliary diode means and second diode means connected in closed series relation with said auxiliary voltage source, said fuse means and said auxiliary diode means and in parallel with said auxiliary winding.

References Cited

UNITED STATES PATENTS

| | | |
|---|---|---|
| 2,130,411 | 9/1938 | Bedford. |
| 2,935,676 | 5/1960 | Keltz _____ 321—11 |
| 3,143,729 | 8/1964 | Power. |

JOHN W. CALDWELL, Primary Examiner

D. K. MYER, Assistant Examiner

U.S. Cl. X.R.

307—314; 321—12